(12) United States Patent
Maekawa et al.

(10) Patent No.: US 8,180,363 B2
(45) Date of Patent: May 15, 2012

(54) COMMUNICATION APPARATUS PREVENTING COMMUNICATION INTERFERENCE

(75) Inventors: Itaru Maekawa, Tokyo (JP); Andrew Xavier Estrada, San Diego, CA (US)

(73) Assignees: Sony Computer Entertainment Inc., Tokyo (JP); Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 451 days.

(21) Appl. No.: 11/327,663

(22) Filed: Jan. 6, 2006

(65) Prior Publication Data

US 2007/0111790 A1 May 17, 2007

Related U.S. Application Data

(60) Provisional application No. 60/736,804, filed on Nov. 15, 2005.

(51) Int. Cl.
*H04W 72/00* (2009.01)
*H04W 40/00* (2009.01)

(52) U.S. Cl. ........................ 455/454; 455/448

(58) Field of Classification Search .......... 370/310, 370/338, 339, 469; 455/454, 448
See application file for complete search history.

(56) References Cited

U.S. PATENT DOCUMENTS

| 7,486,932 | B2 | 2/2009 | Palin et al. | |
|---|---|---|---|---|
| 2003/0214961 | A1* | 11/2003 | Nevo et al. | 370/401 |
| 2005/0026637 | A1* | 2/2005 | Fischer et al. | 455/502 |
| 2006/0030266 | A1 | 2/2006 | Desai et al. | |
| 2009/0103474 | A1 | 4/2009 | Lu et al. | |

FOREIGN PATENT DOCUMENTS

| EP | 1 207 654 | * | 9/2001 |
|---|---|---|---|
| EP | 1 207 654 | | 5/2002 |
| JP | 2001-38057 | | 2/2001 |
| JP | 2002-306836 | | 10/2002 |
| JP | 2005-142860 | | 6/2005 |
| WO | 1 207 654 | * | 5/2002 |
| WO | 03/105418 | | 12/2003 |
| WO | WO 2004/023746 | | 3/2004 |
| WO | 2004/051933 | | 6/2004 |
| WO | WO 2004/079999 | | 9/2004 |

OTHER PUBLICATIONS

European Search Report dated Jul. 3, 2006.
"IEEE Std. 802.15.2-2003: Coexistence of Wireless Personal Area Networks with Other Wireless Devices Operating in Unlicensed Frquency Bands" Aug. 28, 2003, XP007900722.

(Continued)

*Primary Examiner* — Michael Faragalla
(74) *Attorney, Agent, or Firm* — Katten Muchin Rosenman LLP

(57) ABSTRACT

A game apparatus according to a preferred embodiment includes a first wireless communication module and a second wireless communication module. The first wireless communication module performs communication utilizing Bluetooth protocols, whereas the second wireless communication module performs communication utilizing IEEE protocols. The first radio communication module and the second radio module have a common reference communication cycle, and each communicates in communication cycles of an integral multiple of the reference communication cycle. A control unit sets offset time between the start time of a communication by the first wireless communication module until the start time of a communication by the second wireless communication module. In so doing, the control unit monitors the communication load of the first wireless communication module and sets the offset time based on a monitored result.

21 Claims, 7 Drawing Sheets

OTHER PUBLICATIONS

Japanese Office Action dated Jan. 29, 2008, from the corresponding Japanese Application.
Notification of Reason(s) for Refusal dated Nov. 30, 2010, from the corresponding Japanese Application.
Search Report: Sushi Coexistence Solution for PS3, Dec. 11, 2009, pp. 1-14, Pangea 3.

Tsung-Chuan Huang, et al., "Coexistence Mechanisms for Bluetooth SCO Link and IEEE 802.11 WLAN" Nov. 12, 2006, pp. 424-431, vol. 2, http://ieeexplore.ieee.org/stamp/stamp.jst?tp=&arnumber=402147&isnumber=4021174.

* cited by examiner

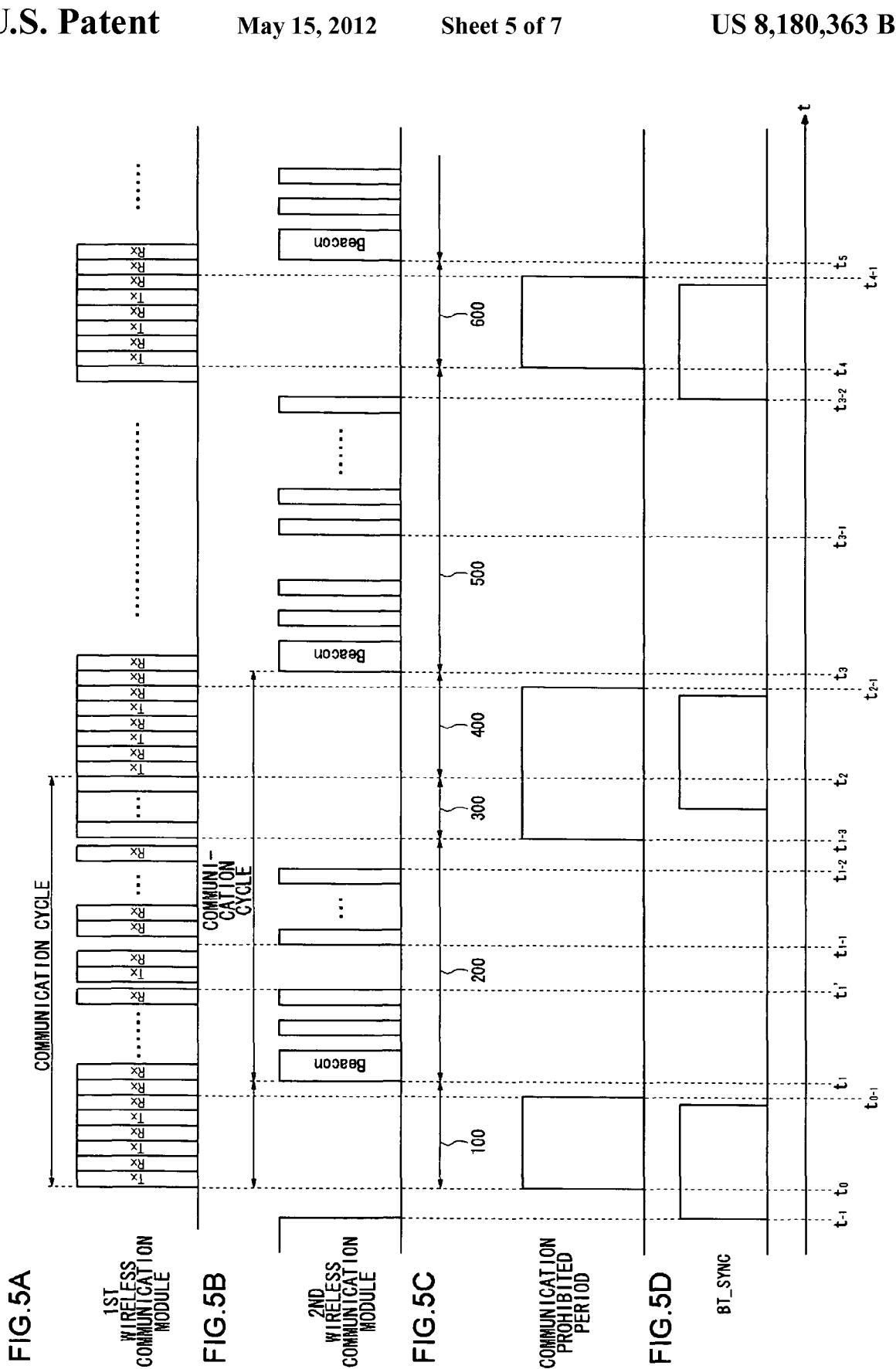

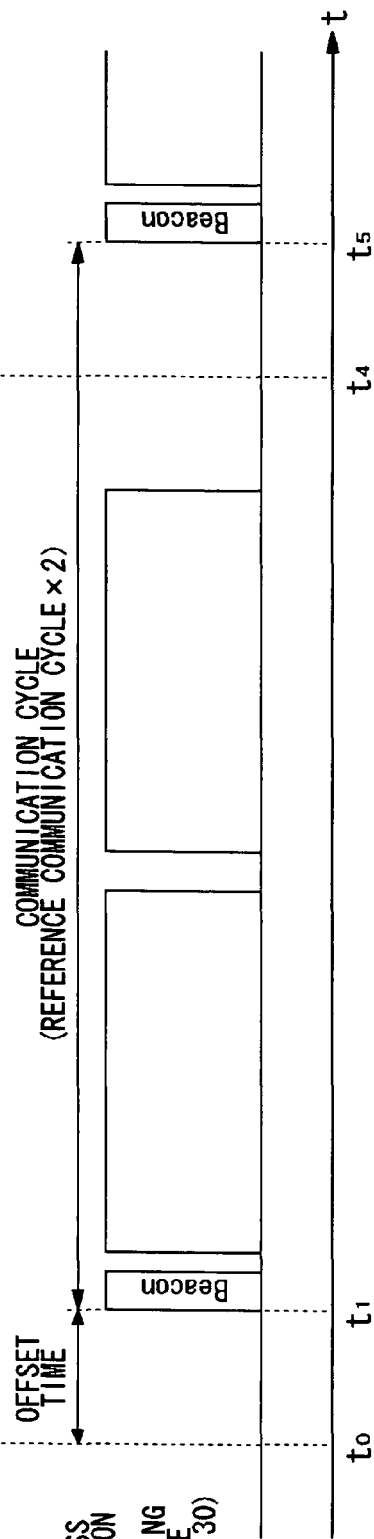
FIG.6A
FIG.6B

COMMUNICATION APPARATUS PREVENTING COMMUNICATION INTERFERENCE

CROSS REFERENCE TO RELATED APPLICATION

This application claims priority from U.S. Provisional Application Ser. No. 60/736,804, filed Nov. 15, 2005, the contents of which are herein wholly incorporated by reference.

BACKGROUND OF THE INVENTION

1. Field of the Invention

The present invention relates to radio communication apparatuses with wireless communication functions, and it particularly relates to a communication terminal apparatus equipped with a plurality of communication modules.

2. Description of the Related Art

In recent years, a variety of wireless communication protocols have been proposed and put to practical use. Representative of such protocol technologies are the wideband wireless local area network system (WLAN) standardized by the IEEE 802.11 and the wireless communication technology for mobile information devices □e.g., Bluetooth: registered trademarks□ standardized by the IEEE802.15.1. Incorporated into diverse information terminal apparatuses, such technologies are used in wireless connection with peripheral devices, such as PDAs (personal digital assistants), printers and headsets. Owing to the technological innovation of recent years, wireless communication modules today are manufactured small and inexpensive, and it is also possible to build modules employing multiple types of wireless communication protocols into a single device or casing.

A wireless communication module must be able to transmit signals for a certain distance, receive weak radio waves transmitted by a peripheral device and reproduce signals therefrom. Accordingly, a wireless communication module is structured by a transmitter capable of high output and a receiver with high sensitivity.

If a plurality of wireless communication modules are built into a single device or casing, those wireless communication modules will be placed in close proximity to one another because of the limited space. As a natural consequence, mutual interference of radio waves occurs among the wireless communication modules themselves. In particular, the problem of mutual interference can be pronounced between a wireless communication protocol defined by the IEEE 802.11 (hereinafter referred to as "WLAN" or "WLAN protocol") and a wireless communication protocol defined by the IEEE 802.15.1 (hereinafter referred to as "Bluetooth" or "Bluetooth protocol"), both of which use the same 2.4 GHz band.

A technology developed for the Bluetooth protocol to avoid interference among different wireless communication modules is called AFH (Adaptive Frequency Hopping). The AFH technology stabilizes communication under the Bluetooth protocols by frequency hopping, in which a Bluetooth communication module avoids the use of the frequency bands occupied by the other communication modules in the same range of frequency and uses only usable frequencies for communication.

However, when a plurality of wireless communication modules are built into a single device or casing, those wireless communication modules must be placed in close proximity to one another. Thus, the countermeasure by AFH alone cannot sufficiently eliminate the mutual interference of radio waves therebetween. Especially when a wireless communication module is in a transmission mode and at the same time another adjacent wireless communication module is in a reception mode, the latter cannot avoid receiving the high-output transmission waves outputted by the former in close vicinity. Consequently, the signals to be received primarily may get buried in the received radio waves, thus creating a situation where necessary signals cannot be reproduced properly. Therefore, it is strongly desired that a technology be developed that can realize a stable communication when a plurality of wireless communication modules are built into a single device or casing.

SUMMARY OF THE INVENTION

In order to solve the above problems, a communication terminal apparatus according to a preferred embodiment of the present invention comprises: a first wireless communication module; a second wireless communication module; and a control unit. The first wireless communication module executes communication in a predetermined frequency band, using a first communication scheme. The second wireless communication module executes communication in the predetermined band, using a second communication scheme that differs from the first communication scheme. The control unit has said first wireless communication module and said second wireless communication module, respectively, execute communication in accordance with a common reference communication cycle. The control unit may set, to the second wireless communication module, a communication prohibited period in each reference communication cycle. Moreover, a communication cycle in the first wireless communication module and the second wireless communication module may be set to an integral multiple of a reference communication cycle.

According to this embodiment, a communication duration is reliably secured for the first wireless communication module by disabling communication by the second wireless communication module. In other words, the execution of communication by the second wireless communication module is prohibited during the period in which the first wireless communication module is executing a communication. Thus, a state in which one communication is not interfered with another communication can be created.

It is to be noted that any arbitrary combination of the above-described structural components and expressions changed among a method, an apparatus, a system, a recording medium, a computer program and so forth are all effective as and encompassed by the present embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 5A shows a state of communication between a first wireless communication module and a radio game-controller; FIG. 5B shows a state of communication by a second wireless communication module; FIG. 5C shows a period in which a communication between a second wireless communication module and a mobile game machine/PC is to be prohibited; and FIG. 5D shows an example of a state of transmission of BT_Sync transmitted from a first wireless communication module to a second wireless communication module.

FIG. 6A shows a state of communication between a first wireless communication module and a radio game-controller; and FIG. 6B shows a state of communication between a second wireless communication module and a mobile game machine.

DETAILED DESCRIPTION OF THE INVENTION

Figure 1:
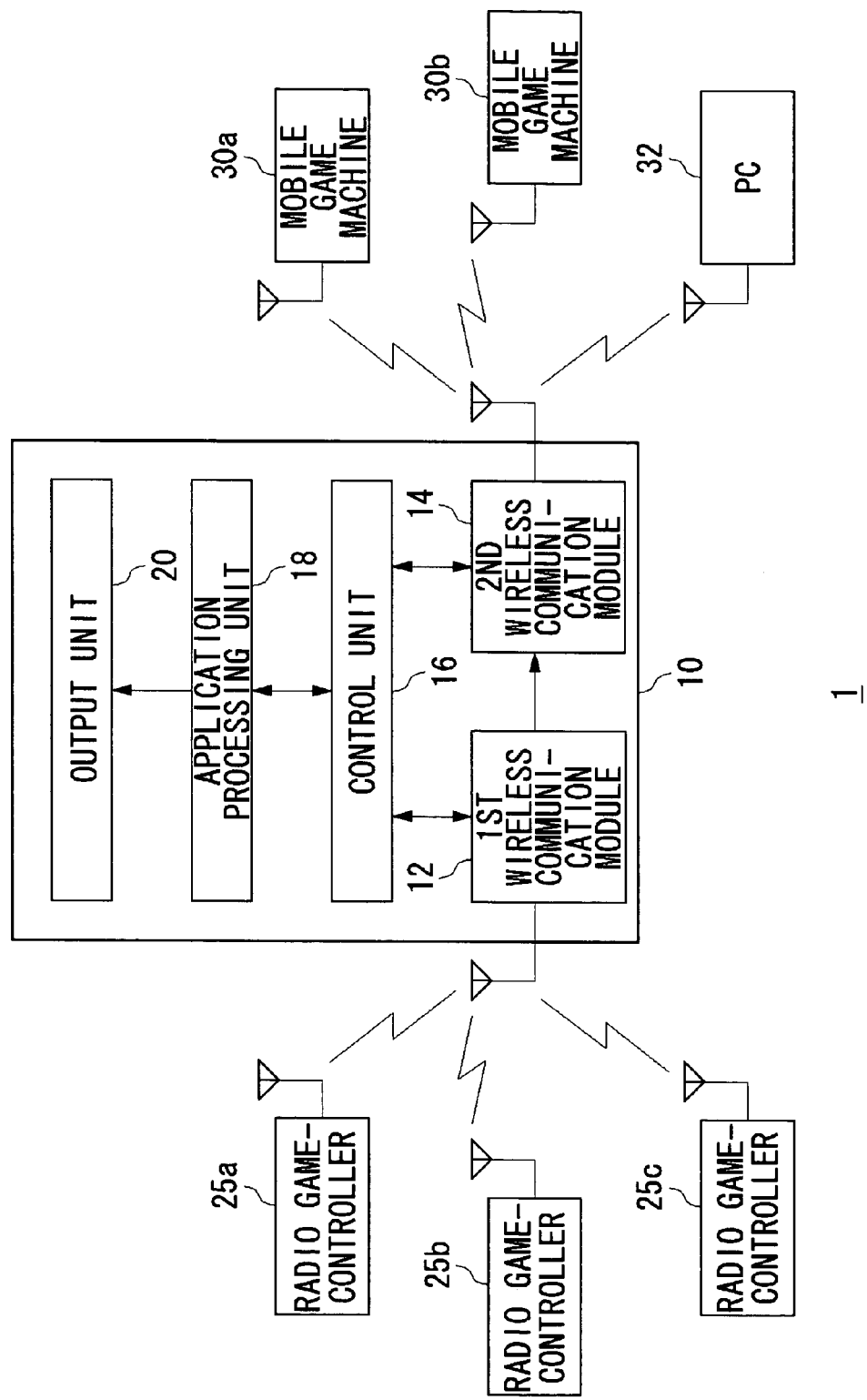
FIG. 1 illustrates a structure of a communication system according to an embodiment of the present invention.

The terms and description used in defining the preferred embodiments of the present invention to be taken with the accompanying drawings are set forth for the purposes of clarification and illustration only. The present invention described herein are not meant as limitations but are to be understood to include all the equivalent technologies that are implemented for the similar purpose under the similar rules.

Before describing the present invention in detail, an outline of the present invention will be described first. A communication system according to an embodiment of the present invention includes a game apparatus which includes two wireless communication modules in a single device or casing and a controller which instructs the game apparatus. The two wireless communication modules use each the same frequency band. For example, one of the two wireless communication modules performs communication, by Bluetooth, with a controller that gives instructions to a game apparatus or the like. The other thereof performs communication, by WLAN, with a mobile game machine or the like which may be equivalent to a PC or controller. In such a case, in order to prevent cross talk between them and also to avoid interference by the other, the communication execution in the two wireless communication modules needs to be properly scheduled in terms of timing. Though "scheduling" may be defined by various modes, the description will be herein given of a periodic scheduling.

A periodic scheduling is accomplished, as a general rule, by executing either one of Bluetooth communication and WLAN communication in a given communication period. However, where a communication period is set fixedly, there are cases where one of the communications must be put on standby until the arrival of the next communication period even when a longer execution time therefor is desired within a communication period. For example, when a game participated simultaneously by a plurality of people is being played, a new person who wants to join the game may suffer an inconvenience of being unable to join in it right away. Any new participation in a game cannot be anticipated because it is accomplished by the operation of a controller by the decision of the user. There is also another problem that if a communication time is set longer within a communication period after the operation of the controller, then smooth participation in the game will be further hampered.

Bluetooth communication and WLAN communication generally use the same frequency band, so that when such communications are executed at the same time, they interfere with each other. Also, the protocol for Bluetooth communication is less flexible than the protocol for WLAN communication. According to the present embodiment, therefore, interference is avoided with a WLAN wireless communication module carrying out a scheduling semiautonomously by grasping the state of communication by a Bluetooth wireless communication module. To grasp the state of communication of a Bluetooth wireless communication module, the Bluetooth wireless communication module may send or convey a signal, such as a pulse signal or a synchronous signal, which shows the state of communication thereof, to the WLAN wireless communication module. Then, based on the state of communication of the Bluetooth wireless communication module or the like, the WLAN wireless communication module semiautonomously stops a transmission to a portable game and also sends a signal to have the portable game disable a transmission therefrom. Furthermore, as an arrangement to realize a flexible midway participation by a new user in a game or communication currently going on, an interval in which the execution of communication by a Bluetooth wireless communication module is protected (hereinafter referred to as "protected period") is set longer within at least one of a plurality of communication periods. The details of this arrangement will be described later.

Employing an embodiment such as this assures the coexistence of communication by Bluetooth and communication by WLAN. Also, even when the amount of communication by WLAN is large, the protected period is set longer in certain communication periods, so that the Bluetooth communication time can be obtained without fail. Note, however, that while communication by a Bluetooth wireless communication module in the protected period is guaranteed, it is not always necessary to conduct a communication in that period. For example, if there is an interval with a smaller amount of communication by WLAN, the Bluetooth wireless communication module can use communication time slots given to the WLAN wireless communication module for its own communication. Therefore, this additional use of the time slots can further enhance the possibility of midway participation by a user in the game.

FIG. 1 illustrates a structure of a communication system 1 according to an embodiment of the present invention. The communication system 1 includes a game apparatus 10, radio game-controllers 25a, 25b and 25c (hereinafter referred to as "radio game-controller 25") for wireless connection with the game apparatus 10, mobile game machines 30a and 30b (hereinafter referred to as "mobile game machine 30") and a personal computer 32 (hereinafter referred to as "PC 32"). The game apparatus 10 comprises, in a single device or casing, a first wireless communication module 12 and a second wireless communication module 14, both having communication functions, a control unit 16 which manages the game apparatus in a controlled manner, an application processing unit 18 which executes game applications, and an output unit 20 which outputs the results of processing a game application. The game apparatus 10, which is provided with the first wireless communication module 12 and the second wireless communication module 14, functions as a wireless communication terminal apparatus. The first wireless communication module 12 and the second wireless communication module 14 realize their respective communications using their respective wireless communication protocols or wireless communication schemes in the same frequency band. It is to be noted that the first wireless communication module 12 may perform its communication with a weaker communication power than that of the second wireless communication module 14.

The radio game-controllers 25 in the communication system 1 are game controllers for the game apparatus 10, and one or more users may play a game by operating a radio game-controller 25 or radio game-controllers 25 while watching the game screen displayed on the display for the game apparatus 10. The mobile game machines 30 are terminal apparatuses that allow a plurality of persons to play a game simultaneously by getting a mobile game machine 30 in communication with another mobile game machine 30 via the game apparatus 10 serving as a relay station. The mobile game machines 30 may also have a function of receiving moving image data from the game apparatus 10 and offering the moving images to the users. Moreover, the mobile game machines 30 may be used as game controllers for the game apparatus 10, and the users may play a game by operating the mobile game machines 30 while watching the game screen displayed on the display for the game apparatus 10. Thus, the game apparatus 10 may function in response to a plurality of intended usages.

The control unit 16 schedules the execution of communication by the first wireless communication module 12 and the second wireless communication module 14. In an embodiment of scheduling, one mode is selected from a plurality of preset modes. Hereinbelow, a detailed description is given of a mode that has communication executed by the first wireless communication module 12 and the second wireless communication module 14 periodically (hereinafter referred to as "periodic mode" or "periodic communication mode").

The periodic mode is a mode for avoiding mutual interference between WLAN communication and Bluetooth communication, in which a first wireless communication module 12 and a second wireless communication module 14 are required to perform their respective communications using the reference communication cycle common thereto. The periodic mode is also a mode which may be selected when a user is playing a game using a radio game-controller 25 or a mobile game machine 30 as a controller and at the same time another user desires to use a PC 32. In this case, communication between the game apparatus 10 and the radio game-controller 25 or the mobile game machine 30 is considered to require greater real-timeliness than the communication with the PC 32, so that it is necessary to provide a sufficient communication time and/or communication band for the radio game-controller 25 or the mobile game machine 30. "Requiring greater real-timeliness" means, among others, that retransmission, as a rule, is not assumed or permitted and/or permissible processing delay is small. For example, it means that when a user operates a radio game-controller 25 or a mobile game machine 30, he/she does not feel displeasure because all the contents of his/her operation are communicated to the game apparatus 10, the game apparatus 10 executes the contents faithfully, and in addition the execution is reflected fully by the screen display. The Bluetooth protocol used in the communication with a radio game-controller 25 is often subject to the difficulty of timing control than the WLAN protocol used in the communication with a PC 32. Hence, it is so arranged that the WLAN protocol used in the communication between the PC 32 and the game apparatus 10 executes the scheduling for communication in consideration of the state of communication between the radio game-controller 25 and the game apparatus 10. Furthermore, when used as a controller, the mobile game machine 30, for which communication is executed by WLAN protocol as with the PC 32, has a higher priority than the PC 32. Accordingly, the arrangement is such that the communication between the PC 32 and the game apparatus 10 is executed after the end of communication between the mobile game machine 30 and the game apparatus 10.

Certain types of games may require midway participation by a user or users after the game has been started. In anticipation of this kind of situation, the WLAN protocol determines an enabled communication interval for the second radio communication module 14 to be periodically shorter in order to provide a sufficient communication time and/or communication band for the first radio communication module 12, which is to communicate with a radio game-controller 25 participating halfway. In other words, the control unit 16 sets a periodically longer time for the period where communication by the second radio communication module 14 is prohibited or disabled. The arrangement like this can provide the users with a pleasant communication environment and/or game playing environment. Moreover, even when a plurality of users use a plurality of applications almost simultaneously, there will be no interruptions of the communication and/or the game. The second wireless communication module 14 may operate semiautonomously in such a manner as not to hinder the execution of communication by the first wireless communication module 12, based on the instruction by a parameter sent form the control unit 16 and/or the information on the state of communication of the first wireless communication module 12 sent therefrom. It is to be noted that the above-described scheduling may be realized with the control unit 16 controlling everything and sending instructions as appropriate to the first wireless communication module 12 and the second wireless communication module 14.

In the present embodiment, the first wireless communication module 12 enables wireless connection with a plurality of radio game-controllers 25 by performing wireless communication under the Bluetooth protocol. Bluetooth employs a frequency-hopping spread spectrum to reduce interference. In the communication system 1, the first wireless communication module 12 functions as a master to the radio game-controller 25 and the radio game-controller 25 functions as a slave thereto. A piconet is formed between the first wireless communication module 12 and the radio game-controller 25. A piconet is a network formed temporarily between Bluetooth terminals when they are placed close to one another, and a maximum of eight Bluetooth terminals can participate in a single piconet. Hence, the first wireless communication module 12 as a master can be wirelessly connected with a maximum of seven radio game-controllers 25.

The second wireless communication module 14 enables wireless connection with a plurality of mobile game machines 30 and a PC 32 by performing wireless communication under the IEEE802.11 protocol. The IEEE802.11 protocol to be employed may be IEEE802.11b and/or IEEE802.11g, for instance. In the communication environment of the IEEE802.11 protocol, the second wireless communication module 14 functions as an access point. In the MAC layer technology of wireless LAN using the IEEE802.11 protocol, CSMA/CA (Carrier Sense Multiple Access with Collision Avoidance) is employed as an access control system, so that the IEEE802.11 terminal has a function of transmitting data only after making certain that the communication channel is free for a predetermined length of time or more. This waiting time, which is the sum of a minimum time and the waiting times of random lengths for the respective terminals, prevents the collision of signals which may occur if a plurality of terminals transmit signals simultaneously a certain time after an immediately preceding communication.

A description is given here of a case where status information on a game application is communicated between a second wireless communication module 14 and a mobile game machine 30. Data transmission and reception related to the processing of a game application take place among a game apparatus 10, radio game-controllers 25 and mobile game machines 30 as shown in FIG. 1, so that real-timeliness of information transmission among them must be assured to one degree or another. Hence, in the communication system 1 according to the present embodiment, the communication related to the processing of a game application is stabilized by minimizing the overlapping of the period for communication by the first wireless communication module 12 and the period for communication by the radio game-controllers 25 on the time axis as much as possible. On the other hand, the communication between the second wireless communication module 14 and the PC 32, which is not used for the execution of a game application, does not require strict real-timeliness. For example, a state of use is assumed in which the game apparatus 10 is connected to the Internet via a router and the PC 32 is transmitting and receiving Email. Accordingly, the communication between the second wireless communication module 14 and the PC 32 is carried out in the time zone where neither the communication between the first wireless communication module 12 and a radio game-controller 25 nor the communication between the second wireless communication module 14 and a mobile game machine 30 is taking place.

Figure 2:
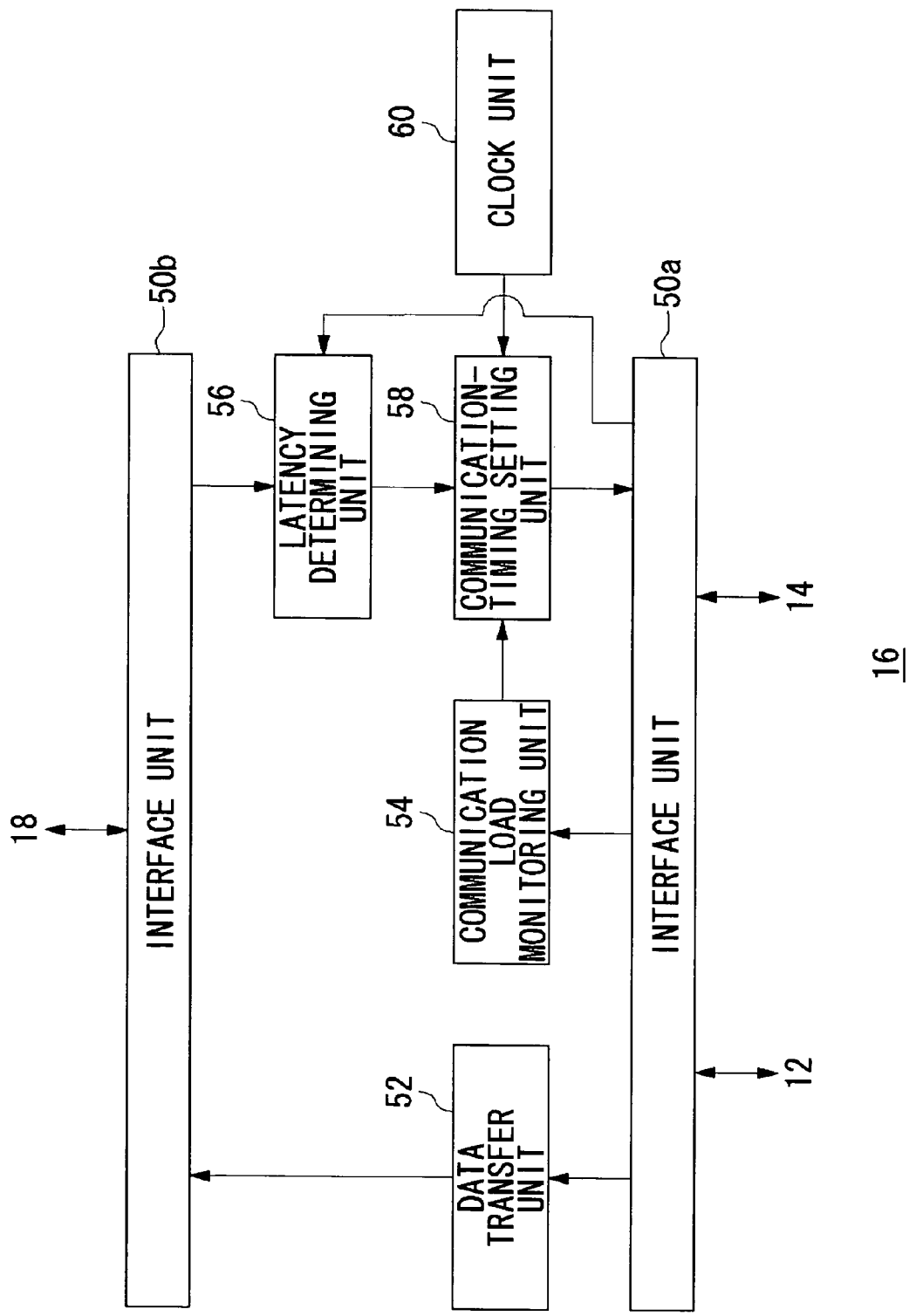
FIG. 2 is an example of function blocks for a control unit.

FIG. 2 is an example of a block diagram showing the functions of a control unit 16. The control unit 16, having an interface unit 50a between itself and a first wireless communication module 12 and a second wireless communication module 14 and an interface unit 50b between itself and an application processing unit 18, exchanges data with the other structures. The interface unit 50a and the interface unit 50b may have a common hardware structure.

The control unit 16 further includes a data transfer unit, a communication load monitoring unit 54, a latency determining unit 56, a communication timing setting unit 58 and a clock unit 60. Although the control unit 16 has a function of performing an overall control of the game apparatus 10, FIG. 2 shows, in particular, the function block for controlling the communication of the game apparatus 10.

The communication controlling functions are realized by a CPU, a memory, a memory-loaded program and the like, but drawn and described herein are function blocks that are realized in cooperation with those. The programs may be incorporated into a game machine 10 and may be supplied externally in a form stored in a recoding medium. Thus, it is understood by those skilled in the art that these function blocks can be realized in a variety of forms such as by hardware only, software only or the combination thereof.

The communication load monitoring unit 54 monitors the respective communication loads of the first wireless communication module 12 and the second wireless communication module 14. The communication load monitoring unit 54 may grasp the respective communication loads of the communication modules by monitoring the number of radio game-controllers 25 wirelessly connected to the first wireless communication module 12 and the number of mobile game machines 30 connected to the second wireless communication module 14. The communication load monitoring unit 54 may monitor the respective communication loads of the first wireless communication module 12 and the second wireless communication module 14 periodically. Also, when there is any change in the numbers of units connected thereto, the communication load monitoring unit 54 may monitor the communication loads by receiving the new numbers of units connected thereto from the respective wireless communication modules 12 and 14. The communication load monitoring unit 54 sends the results of monitoring the respective communication loads of the communication modules to the communication timing setting unit 58.

The communication timing setting unit 58 receives the results of monitoring the respective communication loads of the first wireless communication module 12 and the second wireless communication module 14 and sets parameters respectively for the first wireless communication module 12 and the second wireless communication module 14. The parameters to be sent from the control unit 16 to the second wireless communication module 14 in the periodic mode may include, at least, "mode information", "communication cycle", "communication prohibited period", and "cycle for communication prohibited period". "Mode information" is an identification information for scheduling the first wireless communication module 12 and the second wireless communication module 14, and the message to be conveyed herein is the periodic communication mode. This message is sent at least to the second wireless communication module 14. "Communication cycle" is a communication cycle for the first wireless communication module 12 or the second wireless communication module 14, which has an integral multiple length of a predetermined reference communication cycle.

"Communication prohibited period" or "communication suppression period", which includes a period prohibiting communication by the second wireless communication module 14, is set for each communication cycle. In a communication prohibited period, a communication duration is reliably secured for the first wireless communication module 12 by disabling communication by the second wireless communication module 14. Also, the communication prohibited period may or may not be defined as consecutive periods. Where a communication prohibited period is to be set as a nonconsecutive duration, the period from the top timing to a first timing may be set as a first communication prohibited period, and the period from a second timing after the first timing to the end timing of the communication period may be set as a second communication prohibited period, for instance. The description hereinbelow assumes that the communication prohibited period is a nonconsecutive duration.

The first communication prohibited period may be set based on the communication load of the first wireless communication module 12. For example, where the first wireless communication module 12 is managing three radio game-controllers 25, it is necessary that there are a total of six time slots for polling the respective radio game-controllers 25 and receiving the responses therefrom. In this case, the communication timing setting unit 58 decides that the time for at least 6 time slots is necessary for the communication by the first wireless communication module 12 and thus sets the first communication period to the time for 6 time slots or more, or preferably the time for 6 time slots. As will be described later, it is preferable that the communication between the first wireless communication module 12 and a radio game-controller 25 be done in a bursty manner so as to facilitate the computation of the first communication period. It is to be noted here that setting an integral multiple length of a reference communication cycle for each of the communication periods can make the relative time difference in the start time of each of the communication periods constant. By implementing this arrangement, the first communication prohibited period may, in principle, be fixed so long as there is no change in the number of external terminals connected to the first wireless communication module 12 and the second wireless communication module 14, and thus the communication timing setting unit 58 may determine the first communication prohibited period only once.

Here, the second communication prohibited period includes a duration in which the first wireless communication module 12 carries out a page scan of two frequency bands alternately. The second communication prohibited period may also be set with an added time to search for a radio game-controller 25 which will newly establish a wireless connection with the first wireless communication module 12. The time to search a new radio game-controller 25 includes the time for the first wireless communication module 12 to "inquire" peripheral communication terminals about possible connection and the time therefor to "call" after recognizing such a radio game-controller 25. The page scan is carried out normally during a communication prohibited period by the control unit 16, when communication between the radio game-controller 25 and the first wireless communication module 12 is reliably secured, but may also be carried out during a period other than the communication prohibited period. This is because the second wireless communication module 14 is not always communicating during periods other than a communication prohibited period. The second communication prohibited period may be set by the control unit 16 to the second wireless communication module 14 at the rate of once an integral multiple of a reference communication cycle or communication cycle. Here, the page scan by the control unit 16 is carried out once every communication period alternately for the two frequency bands. In this case, if the second communication prohibited period is set for a rate of once an even-numbered multiple of a reference communication cycle or communication cycle, then the page scan duration for the same one of the frequency bands will always be longer, thus making it impossible to make the page scan duration for the other frequency band long. Hence, the second communication prohibited period should preferably be set to occur at the rate of once an odd-numbered multiple of a reference communication cycle or communication period. Note also that the page scan includes, among others, the search by the first wireless communication module 12 for a radio game-controller 25 that is about to start a communication using the Bluetooth protocol. Such an arrangement provides the user with a pleasant operation environment.

The second wireless communication module 14 executes a communication using the CSMA/CA scheme, so that it is not easy to determine an accurate time from the start to the end of the communication. Hence, it is preferable that the communication timing setting unit 58 predicts the time from the start to the end of communication by the number of mobile game machines 30 being controlled by the second wireless communication module 14 and then sets a second communication period by adding a certain time margin to the predicted time. The communication timing setting unit 58 set parameters in such a manner as to avoid the overlapping of communications by the first wireless communication module 12 and the second wireless communication module 14. It is to be noted that a communication prohibited period is normally shorter than a communication cycle. Accordingly, when the sum of the execution periods of communication by the first wireless communication module 12 and the second wireless communication module 14 is larger than M times (M an integer greater than or equal to 1) and not more than (M+1) times the reference communication cycle, the communication timing setting unit 58 sets each of the communication period of the first wireless communication module 12 and the communication period of the second wireless communication module 14 to (M+1) times the reference communication cycle or more. This arrangement can create a condition where there is no overlapping of the communications by the first wireless communication module 12 and the second wireless communication module 14.

Setting the communication prohibited period like this can not only reliably secure the communication time for the first wireless communication module 12 but also improve the throughput of communication. It should be noted here that the first wireless communication module 12, as a rule, executes communication during a communication prohibited period, when the second wireless communication module 14 is not communicating, but may also execute communication during a period other than the communication prohibited period. This is because the second wireless communication module 14 is not necessarily always communicating during periods other than a communication prohibited period and thus there are possibilities that the first wireless communication module 12 can execute communication. In such a case, the first wireless communication module 12 may not always be able to execute communication, but the throughput can be further enhanced if retransmission control or the like is combined.

"Cycle for communication prohibited period" means a cycle to which a second communication prohibited period is applied. For example, "3" for the cycles for communication prohibited period means that in one of the three communication periods, a second communication prohibited period is set together with a first communication prohibited period while a first communication prohibited period only is set in the other two communication cycles. Preferably, a communication prohibited period may be set at a rate of every odd-numbered times of a communication cycle or a reference communication cycle.

The parameters to be sent from the control unit 16 to the first wireless communication module 12 in the periodic communication mode include "start timing of communication cycle". The first wireless communication module 12 sends a pulse information indicative of the start timing of a communication period (hereinafter denoted by "BT_Sync") to the second wireless communication module 14, based on the start timing of the communication cycle. Using the BT_Sync sent therefrom, the second wireless communication module 14 derives the start timing of a first communication prohibited period. In other words, BT_Sync makes it possible for the second wireless communication module 14 to cause a mobile game machine 30 or a PC 32, which is the other communication party, to stop communicating and to find the duration in which the second wireless communication module 14 itself has to stop communicating. Employing an arrangement like this according to the present embodiment enables processings synchronized between the first wireless communication module 12 and the second wireless communication module 14. Moreover, the second wireless communication module 14, which can find the period in which the second wireless communication module 14 itself has to stop communicating, can autonomously reduce or eliminate the mutual interference of radio waves between the wireless communication modules, thus realizing a game apparatus 10 that provides stable communication.

As previously described, in a game apparatus 10 according to the present embodiment, the first wireless communication module 12 and the second wireless communication module 14 have a reference communication cycle common thereto. In the first wireless communication module 12, which is a Bluetooth master, the reference communication cycle is set to the minimum interval of polling, which individually calls the radio game-controllers 25 at every operation during the intermittent operation in a sniff mode. On the other hand, in the second wireless communication module 14, the reference communication cycle is set as the minimum beacon interval under the IEEE802.11 protocol. With a game apparatus 10 according to the present embodiment, the results of processing by the application processing unit 18 are outputted as moving images by the output unit 20, and accordingly the reference communication cycle is set, for instance, to 11.25 msec if it is necessary to assure one time of communication of each terminal with the game apparatus 10 within a frame based on the frame rate of the moving images.

The communication timing setting unit 58 sets the respective communication periods for the first wireless communication module 12 and the second wireless communication module 14 to certain integral multiples of the reference communication cycle. The first wireless communication module 12 and the second wireless communication module 14 communicate with their respective external terminals at the communication periods, which are integral multiples of the reference communication cycle, by repeating their respective communication states and noncommunication states alternately. Since the respective communication starting times of the first wireless communication module 12 and the second wireless communication module 14 are equal to the starting times of their respective communication cycles, communications with the external equipment will start together with the starts of the communication cycles. In this present specification, the communication cycles of the second wireless communication module 14 is the communication cycle used in the communication between the second wireless communication module 14 and a mobile game machine 30. As discussed earlier, the communication between the second wireless communication module 14 and a PC 32 takes place, using free time that may be present. Note that when there is no communication between the second wireless communication module 14 and the PC 32 during this free run time, the first wireless communication module 12 may search for a radio game-controller with which to establish a new wireless connection.

The data transfer unit 52 transmits operation inputs received by the interface unit 50a to the application processing unit 18 from the interface unit 50b. The application processing unit 18 performs processings according to the operation inputs, which cause the game to progress.

From the viewpoint of requirement for real-timeliness, the game applications can be roughly classified into two groups, namely, ones requiring higher real-timeliness and ones requiring lower real-timeliness. The games requiring higher real-timeliness are, for example, battle games or racing games, which are fast-progressing and thus require the operation inputs by the users to be reflected quickly in the game screen or other outputs. On the other hand, the games requiring lower real-timeliness are, for example, the match-up games such as shogi (Japanese chess) and mahjong, as well as RPGs (roll-playing games), whose progress is relatively slow.

The updating of a game screen is done at a predetermined frame rate or refresh rate. The rewrite speed for one field at the current stage is 16.7 msec (1/60 sec). Therefore, with a game application requiring high real-timeliness, namely, minimal delay or low delay, it is desirable that the operation inputs from the radio game-controllers 25 be reflected on the game screen at least once per field (16.7 msec).

The same thing can be said for a mobile game machine 30 which uses the second wireless communication module 14 as the access point. That is, it is desirable that the mobile game machine 30 communicate its own status information to the other mobile game machines 30 and find out about the status information of the other mobile game machines 30 at least once per field. The status information in a racing game, for instance, are such absolute information as the position on the course and the direction and speed of the racing car. It is to be noted that the use of absolute information here is on account of the less than adequate reliability of communication in the wireless environment, and therefore if a sufficient reliability can be obtained, knowing the difference information between the past and the present will suffice to achieve an intended result.

In the communication system 1 as shown in FIG. 1, each of the mobile game machines 30 executes an application independently and asynchronously. It is to be noted that for game applications that do not require low delay or low latency, this does not produce any significant effect on the processing of such applications because retransmission processing can be used even when the data update cannot be done in each field.

In view of the aforementioned circumstances, the latency determining unit 56 monitors, via the interface unit 50b, the progress of game processed in the application processing unit 18 and then determines the degree of latency. The above indicates the latency required by the radio game-controller 25. However, the same thing can be said of the mobile game machine 30, and the latency determining unit 56 monitors, via the interface unit 50b, the progress of game in the mobile game machine 30 so as to determine the degree of latency required by the mobile game machine 30. The latency determining unit 56 transmits the determined degree of latency to the communication timing setting unit 58. Hereinbelow, the degree of latency required by the radio game-controller 25 will be discussed and examined.

If the low-delay is required of the radio game-controller 25, the communication timing setting unit 58 sets shorter the communication cycle of the first wireless communication module 12. As described earlier, the communication cycle of the first wireless communication module 12 is set to an integral multiple of a reference communication cycle (11.25 msec). Hence, the communication cycle is set to the minimum duration of a reference communication cycle which is 11.25 msec×1. If, on the other hand, no low-delay is required of the radio game-controller 25, that is, if the real-timeliness required in the progress of game is low, the communication cycle may be set to P times the reference communication cycle (P being an integer greater than or equal to 2). If the required real-timeliness is low, the power consumed by the radio game-controller 25 can be restricted by setting longer the communication cycle of the first wireless communication module 12. In this case, it is possible to set longer the second communication period for the second wireless communication module 14. It is also assumed that the second wireless communication module 14 transmits video data to the mobile game machine 30, so that the communication efficiency of a game apparatus as a whole can be improved by setting shorter a period during which the first communication module 12 is active.

Figure 3:
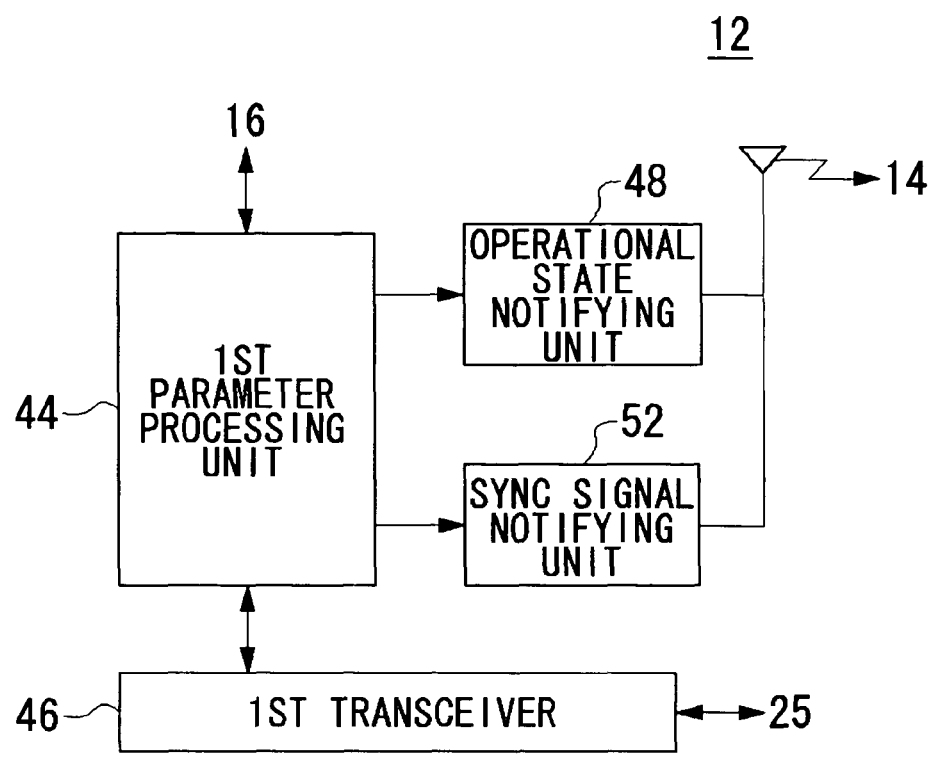
FIG. 3 illustrates an example of the structure of a first wireless communication module shown in FIG. 1.

FIG. 3 illustrates an constitutional example of the first wireless communication module 12 shown in FIG. 1. The first wireless communication module 12 includes a first parameter processing unit 44, a first transceiver 46, an operational state notifying unit 48 and a synchronous signal notifying unit 62. The first transceiver 46 receives operation inputs on game applications from a single radio game-controller 25 or a plurality of radio game-controllers 25, and conveys them to the first parameter processing unit 44. The first parameter processing unit 44 supplies information on the number of controllers participating on a communication or game, instructions from the controller and the like, to the application processing unit 18 via the control unit 16. The application processing unit 18 shown in FIG. 1 executes game applications, based on the received operation inputs. The output unit 20 shown in FIG. 1 is comprised of a display unit, a speaker and so forth, and a processing result by the application processing unit 18 is outputted to this output unit 20. The operational state notifying unit 48 sends BT_Active indicative of a communication execution state in the first wireless communication module 12, to the second wireless communication module 14. BT_Active is a pulse signal by which to stop forcibly the communication by the second wireless communication module 14 if it goes high. The synchronous signal notifying unit 62 sends BT_Sync to the second wireless communication module 14. BT_Sync is a signal generated based on "pulse information indicative of start timing of a communication cycle" which is a parameter notified from the control unit 16. BT_Sync may be risen up with a timing, by a predetermined period, prior to the timing at the beginning of a communication cycle. In the periodic communication mode, BT_Sync alone is taken into consideration in the second wireless communication module 14.

Figure 4:
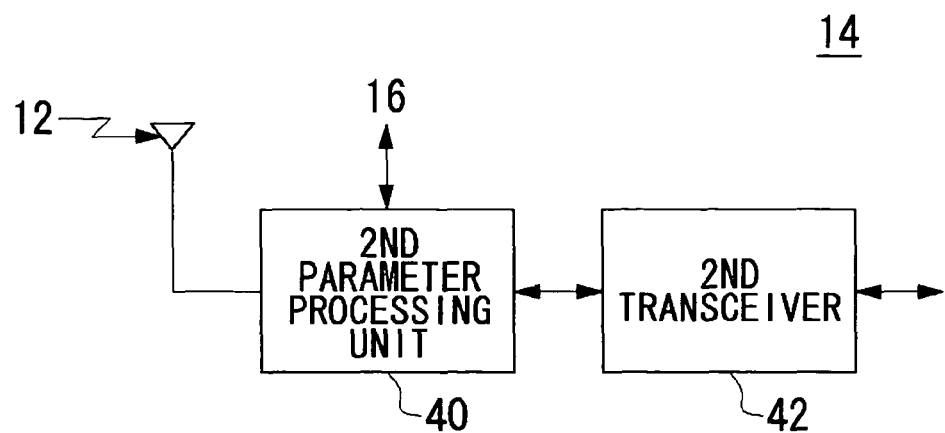
FIG. 4 illustrates an example of the structure of a second wireless communication module shown in FIG. 1.

FIG. 4 illustrates an constitutional example of the second wireless communication module 14 shown in FIG. 1. The second wireless communication module 14 includes a second parameter processing unit 40 and a second transceiver 42. The second transceiver 42 receives the respective status information from a single mobile game machine 30 or a plurality of mobile game machines 30. The second transceiver 42 also transfers the information sent from the control unit 16, to mobile game machines 30 participating in the WLAN. As a result, a game application reflecting the status information on the other mobile game machines 30 is executed in the game apparatus 10, so that a plurality of users can enjoy simultaneously the game by the respective mobile game machines 30. When a mobile game machine 30 is used as a game controller, the second parameter processing unit 40 in the second wireless communication module 14 supplies the operation inputs from the mobile game machine 30 to the application processing unit 18 via the control unit 16, similarly to the first parameter processing unit 44 in the first wireless communication module 12. When a mobile game machine 30 is used as a terminal for use with moving images, the second transceiver 42 delivers moving image data to the mobile game machine 30. The second transceiver 42 transmits to and receives from the PC 32 such data as the moving images.

Now, an operation in the periodic communication mode will be described in detail. FIGS. 5A to FIG. 5D is a timing chart showing examples of the states of communication when the periodic communication mode is selected. FIG. 5A shows a state of communication between a first wireless communication module 12 and a radio game-controller 25. FIG. 5B shows a state of communication by a second wireless communication module 14. FIG. 5C shows a period in which a communication between a second wireless communication module 14 and a mobile game machine 30 or PC 32 under the control thereof is to be suppressed. FIG. 5D shows an example of a state of transmission of BT_Sync transmitted from a first wireless communication module 12 to a second wireless communication module 14. It is assumed here in the timing chart shown in FIGS. 5A to 5D that the communication cycle of the first wireless communication module 12 and the second wireless communication module 14 is set to one time (1×) the reference communication cycle. The horizontal axes shown in FIGS. 5A to 5D indicate the time (t) axes. The start time of communications by the first wireless communication module 12 and the second wireless connection module 14 is identical to the start time of communication cycles of the respective modules 12 and 14. Thus, when the communication cycles of the respective modules 12 and 14 start, the communications by the respective modules 12 and 14 also start.

Assume in the timing chart shown in FIGS. 5A to 5D that "mode information" set by the control unit 16 to the second wireless communication module 14 is the periodic communication mode. The "communication cycle" is set as one time (1×) the reference communication cycle. In FIGS. 5A to 5D, the respective communication cycles are $t_0$ to $t_2$, $t_2$ to $t_4$ and so forth. As "communication prohibited periods", $t_0$ to $t_1$ (first communication prohibited period 100), $t_{1-3}$ to $t_3$ (second communication prohibited period 300 and first communication prohibited period 400) and $t_4$ to $t_5$ (first communication prohibited period 600). Based on BT_Sync notified from the first wireless communication module 12, the second wireless communication module 14 autonomously stops the execution of communication by itself in the communication prohibited periods including the first communication prohibited period 100, second communication period 300, first communication prohibited period 400 and first communication prohibited period 600 conveyed from the control unit 16. The second wireless communication module 14 sends CTS to the mobile game machine 30 and PC 32 under the control thereof so as to stop the execution of communication by them to the second wireless communication module 14. Here, a period, such as $t_1$ to $t_{1-3}$, during which the second wireless communication module 14 is capable of executing a communication is called an unprotected (page scan) interval or an unprotected communication period. In an unprotected communication period 200 or an unprotected communication period 500, the communication by the first wireless communication module 12 is not protected. Hence, even if the page scan for searching a newly participating radio game-controller 25 is performed, it is unlikely to succeed because the communication by the second wireless communication module 14 is present. If a second communication prohibited period exists as a communication suppression interval in the last half of a communication cycle, a period such as $t_{1-3}$ to $t_2$ (second communication prohibited period 300) will be particularly called a protected (page scan) interval or a protected communication period. "Cycle for communication prohibited period" is set to "2". That is, the protected communication period is set once every two communication cycles. More specifically, in the communication cycle of $t_0$ to $t_1$, the period of $t_{1-3}$ to $t_3$ is set as a protected communication period, namely, the second communication prohibited period 300. On the other hand, in the communication cycle of $t_2$ to $t_4$, the protected communication period is not set.

First, the first wireless communication module 12 starts a communication with three radio game-controllers 25 at time $t_0$. It is preferred that the communication between the first wireless communication module 12 and the radio game-controller 25 be performed in a bursty manner and terminated within a short period of time. The first wireless communication module 12 performs polling in sequence with the three radio game-controllers 25, respectively. At each time, the first wireless communication module 12 receives data from the radio game-controller 25. The number of the first wireless communication modules 12 in use is only exemplary here, and one to seven radio game-controllers can be managed by the first wireless communication module 12.

The first wireless communication module 12 notifies the second wireless communication module 14 that the communication be started at time to, and at the same time notifies it of BT_Sync by the communication timing setting unit 58. As a result thereof, the second wireless communication module 14 can obtain time at which a communication starts, namely, TBTT (Target Beacon Transmission Time), and can operate semiautonomously. In this example, the communication prohibited time is set $t_0$ to $t_1$. It is to be noted that the first communication prohibited period in $t_2$ to $t_3$ and $t_4$ to $t_5$ may be identical to the length of $t_0$ to $t_1$. From the start timing of each communication cycle until the end time of the first communication prohibited interval, the first wireless communication module 12 can perform communication with the radio game-controller 25 without being affected from the communication by the second wireless module or WLAN. As shown in FIG. 5A, even in intervals other than the first communication prohibited interval, the first wireless communication module 12 may continue the page scan. By so doing, a communication with the radio game-controller 25 can be executed in an interval, for example, from $t_1$, until $t_{1-1}$ during which the second wireless communication module 14 is not communicating (that is, the second wireless communication module 14 is not active). In another words, a user will enjoy more comfort by using the first wireless communication module 12 whenever the first wireless communication module 12 tries to communicate with the radio game-controller 25 in any period.

When the second wireless module 14 receives BT_Sync and notification of communication prohibited time, it stands by during a period of a first communication prohibited period from time $t_0$ to $t_1$ and further stands by for a period of random waiting time called "back-off" thereafter and then sends a beacon signal. The start time of communication may be represented as relative time from the notification time. The waiting is achieved in a manner such that the second wireless communication module 14 notifies the mobile game machine 30 and PC 32 under the control thereof, of a CTS. A CTS packet includes at least timing and duration for communication stoppage. The mobile game machine 30 notified of the CTS packet stops the communication until the timing with which a communication stays inactive terminates. The second communication module 14 itself stops the execution of communication autonomously.

After the first communication prohibited period has passed ($t_1$, $t_3$ and $t_5$), the second wireless communication module 14 communicates with a communication party to be communicated with a high priority, in a period of time other than the communication prohibited period set by the control unit 16, and then communicates with communication parties other than said communication party. "A communication party to be communicated with a high priority" includes a communication apparatus such as a mobile game machine 30. Hence, if the communication prohibited period is set by a CTS for a long period of time, namely, if a protected communication period is set for a longer period of time, the communication time with a PC 32 and the like will be short. However, since in most cases the degree of instant response required, namely, the degree of real-timeliness required is low with the PC 32 compared with the mobile game machine 30 and the like, no problem will arise in the practical operation.

More specifically, in order to perform communication with a mobile game machine 30, deemed to have a high priority, which is to serve as a game controller that gives instructions to a game apparatus 10, the second wireless communication module 14 sends out a beacon signal. Upon receipt of the beacon signal, the mobile game machine 30 which operates under a control of the second wireless communication module 14 transmits status information on the respective games. Referring to FIG. 5B, the second wireless communication module 14 is allowed to communicate with the mobile game machine 30 until $t_{1-1}$. The second wireless communication module 14 is also allowed to communicate with a PC 32 during a period of time from $t_{1-1}$ until $t_{1-2}$. As shown in FIG. 5C, by the timing $t_{1-3}$ when a protected communication period starts, the second wireless communication module 14 conveys the CTS to the mobile game machine 30 and PC 32 under the control thereof. The CTS in such a case is information that contains communication prohibited periods in both the second communication prohibited period 300 and the first communication prohibited period 400 for the next communication period that follows the period 300. When this CTS is conveyed accordingly, the communication execution in the first wireless communication module 12 is reliably secured also in the period 400 for the next communication period that follows the second communication prohibited period 300. As described earlier, no protected communication period exists in a communication cycle from $t_3$ to $t_4$, so that the second wireless communication module 14 may convey the CTS to the mobile game machine 30 under the control thereof at $t_4$ which is the end timing of a communication cycle.

Prior to the start timing of the communication prohibited period set by the control unit 16, the second wireless communication module 14 may transmit to communication parties such as a mobile game machine 30 executing a communication with said second wireless communication module 14, a NAV (Network Allocation Vector) by which to request the prohibition of said communication, instead of CTS. By employing this arrangement, the communication jamming in the first wireless communication module 12 caused by signals transmitted from the mobile game machine 30 and the like can be prevented. For instance, if equipment that possibly restricts a communication can be identified, a period to restrict a PC 32 may be set, by a NAV, as the sum of the first communication period and the second communication period. Thereby, the interference, caused by the PC 32, of communication between the first wireless communication module 12 and the radio game-controller 25 and of communication between the second wireless communication module 14 and the mobile game machine 30 can be avoided. As a result, the communication in the communication system 1 can be more stabilized.

According to the above-described embodiment, the communication timing setting unit 58 sets the first communication prohibited time between from the communication start time of the first wireless communication module 12 until that of the second wireless communication module 14, based on a monitored result of communication load of the first wireless communication module 12. As another example, it is possible that the communication timing setting unit 58 sets the first communication prohibited period between from the communication start time of the second wireless communication module 14 until that of the first communication module 12, based on a monitored result of communication load of the second wireless communication module 14. For example, if the first wireless communication module 12 starts during execution of a communication by the second wireless communication module 14, a first communication prohibited period by reference to the communication start time of the second wireless communication module 12 may be set. In this case, too, the accurate time management can be facilitated by setting a first communication prohibited period by reference to the communication start time of the first wireless communication module 12 as will be described later.

The first wireless communication module 12 and the second wireless communication module 14 may operate on a common clock. For example, the clock may be supplied to the communication modules 12 and 14, respectively, from the clock unit 60 in the control unit 16. The clock used in either one of the first wireless communication module 12 and the second wireless communication module 14 may be supplied to the other. If a high-speed clock is employed in either the first wireless communication module 12 or the second wireless communication module 14, the use of this scheme will be desirable. Since the first wireless communication module 12 can transmit to and receive from the radio game-controller 25 the data in a bursty manner under an accurate time control, the time management for the communication of the first wireless communication module 12 is achieved relatively easily. Hence, it is preferred that a clock be put to a common use between the first wireless communication module 12 and the second wireless communication module 14 by supplying the clock used in the first wireless communication module 12 to the second wireless communication module 14. If the first wireless communication module 12 and the second wireless communication module 14 are integrally structured, clocks may be supplied from a clock unit which is commonly provided. By sharing the same clocks, the both modules 12 and 14 can be easily synchronized.

According to the present embodiment, the communication cycles for the first wireless communication module 12 and the second wireless communication module 14 are set to integral multiples of a reference communication cycle, respectively. Therefore, the first communication prohibited time between from the communication start time of the first wireless communication module 12 until that of the second wireless communication module 14 can be fixed. As a result, it is only necessary that the offset time be conveyed to the second wireless communication module 14 only once. Thereafter, the respective communication modules use the common clock, so that the stable communication can be performed, without mutual interference, based on the communication cycles set respectively.

The first wireless communication module 12 and the second wireless communication module 14 may operate on their own independent clocks, respectively. For example, if the first wireless communication module 12 and the second wireless communication module 14 are made by different manufactures, the respective communication modules will operate on their own clocks. Hence, it is difficult to achieve the exact synchronization therebetween. As a result, the first wireless communication module 12 may convey to the second wireless communication module 14 the BT_Sync indicated as the communication start timing of the first wireless communication module 12 on a periodic basis so as to align the synchronization. Even if the respective modules employ their own independent clocks, the actual difference between the clocks will be extremely small. Thus, adjusting the operation timing of the second wireless communication module 14 on a periodic basis makes it possible to maintain the state in which the first communication period of the first wireless communication module 12 does not overlap with the second communication period of the second wireless communication module 14.

As discussed earlier, the first communication prohibited time is set in accordance with the time at which the communication in the first wireless communication module 12 has been all completed. Since the first wireless communication module 12 performs communication using Bluetooth protocols, the communication can be executed in a more bursty manner than using the IEEE802.11 protocols employed in the CSMA/CA scheme. Since the first communication prohibited period is set by using the start time of the first wireless communication module 12 as a reference, the free time between the communication end time of the first wireless communication module 12 and the communication start time of the second wireless communication module 14 can be reduced. With reference to an example shown in FIGS. 5A to 5D, there is provide a little time margin between after the communication by the first wireless module 12 has been completed until a beacon is transmitted by the second wireless communication module 14. It is also possible that the communication cycle of the second wireless communication module 14 is started immediately after the completion of communication by the first wireless communication module 12 by setting the time interval from the communication start of the first wireless communication module 12 until the end thereof equal to the first communication prohibited time and then a beacon signal is transmitted from the second wireless communication module 14. On the other hand, the communication timing setting unit 58 may set the first communication prohibited time in a manner such that the time necessary for searching a radio game-controller 25 which establishes a new wireless connection with the first wireless communication module 12 is added up with the time at which the communication in the first wireless communication module 12 has all been completed. This search time may always be included in the first communication prohibited time. Also, if the search frequency is to be reduced, the search time may be periodically included in the first communication prohibited time.

Since there is configured a dynamic wireless network in the communication system 1, not only a case where a new radio game-controller 25 participates in a piconet but also a case where an already participating radio game-controller 25 withdraws from the piconet is possible. In the control unit 16, the communication load monitoring unit 54 may monitor the change in number of radio game-controllers 25 and the communication timing setting unit 58 may reset a first communication prohibited time and/or a communication cycle according to the monitored result. The same is true of a case where a new mobile game machine 30 participates in a wireless LAN or an already participating mobile game machine 30 withdraws from the wireless LAN. That is, the communication timing setting unit 58 may reset the communication cycle according to the monitored result obtained by the communication load monitoring unit 54.

FIGS. 6A and 6B is a timing chart showing a modification of the communication state when a periodic communication mode is selected. FIG. 6A shows a state of communication between the first wireless communication module 12 and the radio game-controller 25. FIG. 6B shows a state of communication between the second wireless communication module 14 and the mobile game machine 30. The states of communication between the second wireless communication module 14 and the PC 32 are omitted in FIGS. 6A and 6B. Similar to FIGS. 5A to 5D, protected communication periods may be provided.

In the timing chart shown in FIGS. 6A and 6B, the communication period for the first wireless communication module 12 and the second wireless communication module 14 is set to double the reference communication cycle. This are the timing chart where no low-delay or minimum-delay is required, and it is assumed herein that a large amount of data is transmitted between the second wireless communication module 14 and the mobile game machine 30. As discussed before, when the communication cycle of the first wireless communication module 12 is set longer, the second communication cycle of the second wireless communication module 14 can be set longer. During this second communication period, HCCA (Hybrid Coordination Function Controlled Channel Access) that guarantees the quality can be executed by a central control using the polling by the second wireless communication module 14.

In HCCA, the second wireless communication module 14 performs scheduling where a high priority is considered or placed on the mobile game machine 30, and the second wireless communication module 14 sends a polling frame describing a channel use time that grants a transmission. During the transmission by the mobile game machine 30 in which the transmission is granted, access from other mobile game machines 30 is restricted and the QoS can be guaranteed.

Although the above is for the case where no low-delay is required of the communication by the radio game-controller 25, the communication cycle of the second wireless communication module 14 may be set longer even in a case where no low-delay is required of a communication by the mobile game machine 30. For example, when the low-delay is required of the communication by the radio game-controller 25 whereas no low-delay is required of the communication by the mobile game machine 30, the communication cycle of the first wireless communication module 12 is set to a reference communication cycle whereas that of the second wireless communication module 14 is set to double the reference communication cycle. The power consumed by the radio game-controller 25 and the mobile game machine 30 can be kept low by reducing the ratio of a communication period to a communication cycle.

Figures 7A, 7B:
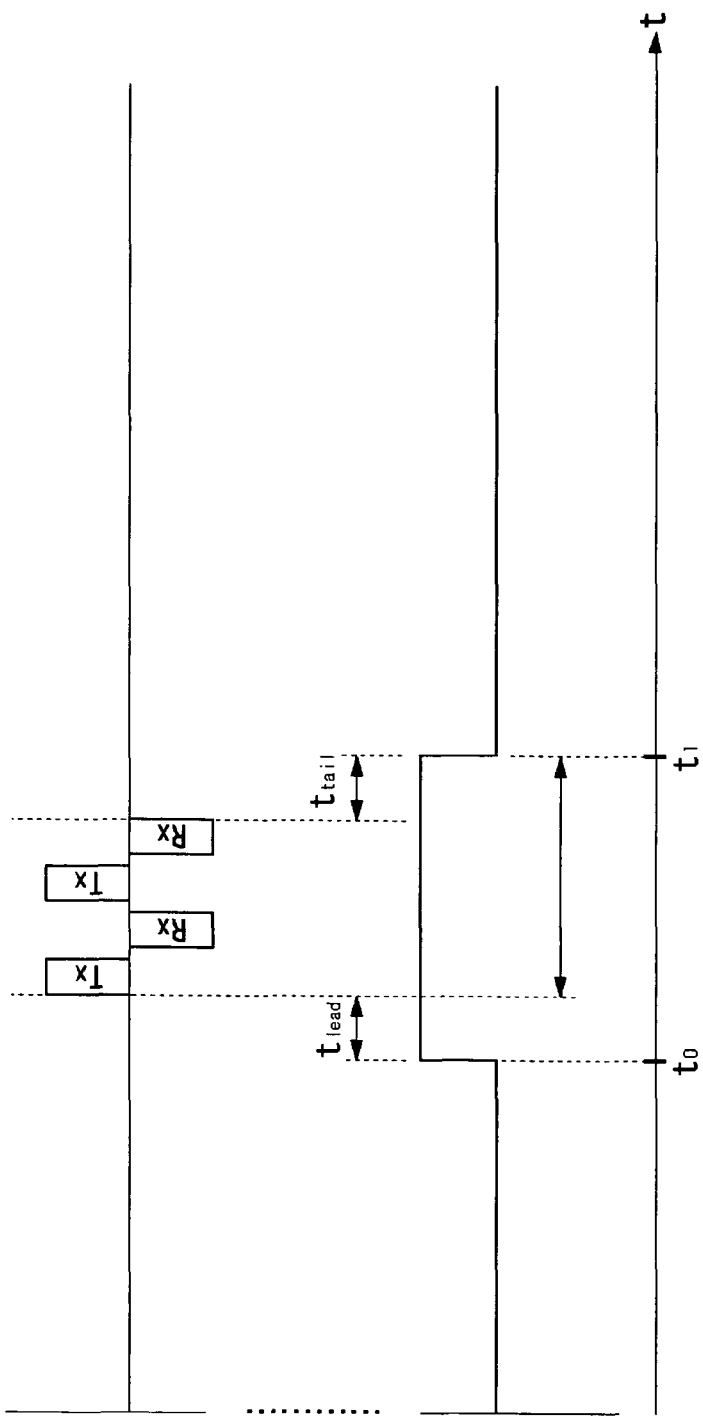
FIG. 7A shows a state of communication between a first wireless communication module and a radio game-controller.
FIG. 7B shows an example of an interval where a communication by a second wireless communication module is prohibited.

FIGS. 7A and 7B is a timing chart showing an example of the communication state when a non-periodic communication mode is selected. FIG. 7A shows a state of communication between the first wireless communication module 12 and the radio game-controller 25. FIG. 7B shows an example of an interval where the communication by the second wireless communication module 14 is prohibited. The states of communication between the second wireless communication module 14 and the PC 32 are omitted in FIGS. 7A and 7B.

Here, the non-periodic communication mode or non-periodic mode is a mode for avoiding mutual interference between WLAN communication and Bluetooth communication, in which the communication by the first wireless communication module 12 is executed on a non-periodic basis. The non-periodic communication mode is mainly used, by Bluetooth, for audio communication. This is because since the audio communication is performed on a non-periodic basis and therefore the periodic control is rather difficult to achieve. When a user uses a PC 32, the non-periodic communication mode may also be used with the game apparatus 10 being not powered on. That is, normally, the only WLAN protocols in the second wireless communication module 14 are used, and the Bluetooth protocols are used if needed. This is because it is difficult to predict in advance the execution of audio communication by a user and the operation of the radio game-controller 25 in a case when the user starts a game. Thus, as the need arises, the first wireless communication module 12 executes a communication with the radio game-controller 25, and while the radio game-controller 25 is in communication, the second wireless communication module 14 semiautonomously stops temporarily the communication with the PC 32 in the light of the state of communication in the first wireless communication module 12.

More specifically, when the first wireless communication module 12 executes communication with the radio game-controller 25, the first wireless communication module 12 transmits beforehand a signal indicative of a communication start request (hereinafter referred to as "BT_Active"), not BT_Sync, to the second wireless communication module 14. While BT_Active is high, the second wireless communication module 14 has only to stop the execution of communication. Also, the above processing may be performed via the control unit 16. In this manner, the second wireless communication module 14 determines whether or not to execute a communication in the light of the state of communication in the first wireless communication module 12, so that the communication by the both modules 12 and 14 can be conducted without interference. As a result, the communication time by the first wireless module 12 can be reliably secured. Furthermore, the second wireless communication module 14 can freely execute a communication as long as the first wireless communication modules 12 is not in communication. Thus, the throughput as a whole system can be improved.

Here, if the non-periodic communication mode is selected, the first wireless communication module 12 needs to properly avoid the communication in the second wireless communication 14 in order to execute the non-periodic communication. Hence, prior to the start of communication, the first wireless communication module 12 conveys a signal, by which to prohibit the execution of communication, to the second wireless communication module 14 in a predetermined period that includes at least a period during which said first wireless communication module 12 is in communication. This notification of the signal is made in an interval between $t_0$ and $t_1$, as illustrated in FIG. 7A. The intervals $t_{lead}$ and $t_{tail}$ may be provided as waiting periods to allow for the first wireless communication module 12 to properly start and terminate a communication. This notification may also be made through the control unit 16. This arrangement according to the present embodiment may also be realized in a manner such that the control unit 16 sends the notification to the both modules 12 and 14. In any case, the second wireless communication module 14 stops the communication while a pulse shown in FIG. 7B stays high. In this manner, the second wireless communication module 14 determines whether or not to conduct a communication in the light of the state of communication in the first wireless communication module 12, so that the communication by the both modules 12 and 14 can be executed without interference.

When controlling the communication functions in the first wireless communication module 12 and the second wireless communication 14, the control unit 16 according to the present embodiment may control the first wireless module 12 and the second wireless communication module 14 in accordance with a mode selected from a plurality of modes to avoid the mutual interference caused between the WLAN communication and the Bluetooth communication. The plurality of modes to avoid the mutual interference caused between the WLAN communication and the Bluetooth communication may include, at least, a periodic communication mode, a non-periodic communication mode, a free-run mode and a full-time suppression mode. The free-run mode is a mode in which the second wireless module 14 constantly executes the communication without ever negotiating it with the first wireless communication module 12 in advance. In this mode, the first wireless communication module 12 may also be able to execute a communication by implementing the aforementioned AFH. The full-time suppression mode is a mode to secure constantly the execution of a communication by a first wireless communication module 12, and this is accomplished when the control unit 16 forcibly prohibits the second wireless communication module 14 from executing the communication. The full-time suppression mode is a mode which is usually used at the time of negotiation for establishing a communication when the Bluetooth protocol starts the communication with the radio game-controller 25. In this full-time suppression mode, the execution of a communication by the WLAN protocol is completely stopped. If the communication by the second wireless communication module 14 is prohibited, it goes without saying that the communication by the mobile game machine 30 and PC 32 under the control thereof will be prohibited, too.

The present invention has been described based on the embodiments which are only exemplary. It is therefore understood by those skilled in the art that other various modifications to the combination of each component and process are possible and that such modifications are also within the scope of the present invention. In FIG. 1, the first wireless communication module 12 and the second wireless communication module 14 have their respective antennas. However, the antennas may be put to a common use. Since the communication periods for the first wireless communication modules 12 and those for the second wireless communication module 14 are assigned in such a manner as not to overlap one another, it is possible to commoditize the antennas.

In the above-described embodiments, the mobile game machine 30 in the communication system of FIG. 1 is in communication with the second wireless communication module 14 using the IEEE802.11 protocol. The mobile game machine 30 may further function as a Bluetooth master and therefore may communicate with other Bluetooth terminal apparatuses. In such a case, the mobile game machine 30 may be equipped with the same communication functions as with the game apparatus 10, and it is preferred that a communication with a Bluetooth terminal apparatus be executed during a communication period assigned between a communication period for the first wireless communication module 12 and that for the second wireless communication module 14.

In the present embodiments, the reference communication cycle is set to 11.25 msec which is shorter than the frame rate (1/60 sec) of moving images. The first wireless communication module 12 receives the user's operation inputs from the radio game-controller 25 or mobile game machine 30 with a communication cycle which is an integral multiple of this reference communication cycle. The control unit 16 may sequentially store input signals received by the first wireless communication module 12 in a buffer memory (not shown). The control unit 16 may read out the input signals stored in the memory to the application processing unit 18, in the cycle of frame rate for moving images.

If the communication cycle is 11.25 msec, there will be cases where the control unit 16 receives the input signals twice from the same game controller during a period of the frame rate (1/60 sec). At that time, the control unit 16 may read out only the most current input signal received to the application processing unit 18. In this case, the buffer memory in the control unit 16 is structured as an overwrite-type memory, so that the input signals received by the first wireless communication module 12 are overwritten sequentially. As a result, the most current input signals are stored in the buffer memory.

The control unit 16 may add up the two input signals stored in a memory and then read out the summation result to the application processing unit 18. For instance, if the first input signal is an indicator signal that indicates to move a character to the right and the next signal is an indicator signal to move the character to the right, the control unit 16 supplies to the application processing unit 18 an indicator signal indicating to move the character to the right twice. For instance, if the first input signal is an indicator signal that indicates to move a character to the right and the next signal is an indicator signal to move the character to the up position, the control unit 16 supplies to the application processing unit 18 an indicator signal indicating to move the character to the right once and move it to the up once. In the communication system 1 according to the present embodiments, the communication cycle and the frame rate are asynchronous to each other. However, when the control unit 16 processes the input signals in the same manner as described above, the operation inputs can be properly reflected on game applications. Though the description has been given of the processing of the input signals received by the first wireless communication module 12, the control unit 16 also performs a similar processing on the input signals received by the second wireless communication module 14.

Also, the information can be transmitted from the game apparatus 10 to the game controllers. As an example, it is conceivable that control information with which to vibrate the game controllers is transmitted according to the progress of a game. It is preferred then that the vibrating information be constantly transmitted to intervals to be vibrated. A structure may be such that a wired controller for controlling the game apparatus 10 by wire communication is provided, control information for starting the vibration is transmitted at the time of starting the vibration and control information for terminating the vibration is transmitted at the time of terminating the vibration. With this structure having the wire communication, the load of control unit 16 can be reduced by reducing the number of transmissions of the control information.

While the preferred embodiments of the present invention have been described using specific terms, such description including objectives and applications is for illustrative purposes only, and it is to be understood that other changes and variations may be made without departing from the spirit or scope of the appended claims.

What is claimed is:

1. A communication terminal apparatus, comprising:
   a first wireless communication module which executes communication in a predetermined frequency band, using a first communication scheme;
   a second wireless communication module which executes communication in the predetermined band, using a second communication scheme that differs from the first communication scheme; and
   a control unit which has said first wireless communication module and said second wireless communication module execute communication in accordance with a reference communication cycle common thereto, wherein said control unit
      determines a first prohibited communication period of said second wireless communication module in each communication cycle of said second wireless communication module, wherein the first communication prohibited period is determined based on a number of wireless terminals wirelessly connected to the first wireless communication module,
      determines a second prohibited communication period of said second wireless communication module every N communication cycles, where N is a natural number more than 1, so that a period for prohibiting said second wireless communication module from executing communication is extended when the second prohibited communication period is included in the communication cycle, and
      sends parameters associated with the first prohibited communication period and the second prohibited communication period to the second wireless communication module,
   wherein the second wireless communication module autonomously stops communication in the first and second prohibited communication periods.

2. A communication terminal apparatus according to claim 1, wherein said control unit sets the second prohibited communication period of said second wireless communication module every N communication cycles where N is an odd number.

3. A communication terminal apparatus according to claim 1, wherein said control unit sets a start timing of communication cycle of said first wireless communication module in a manner such that a communication by said first wireless communication module starts from a start of communication cycle of said first communication module, and said control unit sets a start timing of communication cycle of said second wireless communication module in a manner such that a communication by said second wireless communication module starts from a start of communication cycle of said second wireless communication module, and wherein a start timing of the first prohibited communication period which is set in common in each communication cycle of said second wireless communication module is aligned to the start timing of communication cycle of said first wireless communication module.

4. A communication terminal apparatus according to claim 3, wherein an end timing of the second prohibited communication period is aligned to an end timing of communication cycle of said first wireless communication module, and the first prohibited communication period and the second prohibited communication period are set as a consecutive period.

5. A communication terminal apparatus according to claim 3, wherein the communication cycle of said first wireless communication module is set equal to that of said second wireless communication module, and the start timing of communication cycle of said second wireless communication module is offset, by the first prohibited communication period, from the start timing of communication cycle of said first wireless communication module.

6. A communication terminal apparatus according to claim 1, wherein said first wireless communication module conveys to said second wireless communication module a start timing of said first wireless communication module.

7. A communication terminal apparatus according to claim 1, wherein said control unit controls the execution of communications of said first wireless communication module and said second wireless communication module in accordance with a communication mode among a plurality of communication modes including at least a periodic communication mode in which said first wireless communication module and said second wireless communication module execute communication in accordance with the reference communication cycle common thereto.

8. A communication terminal apparatus according to claim 7, wherein when the periodic communication mode is selected, said control unit sets the first prohibited communication period of said second wireless communication module in each communication cycle of said second wireless communication module.

9. A communication terminal apparatus according to claim 8, wherein, in the periodic communication mode, said second wireless communication module operates in such a manner as not to hinder a communication executed by said first wireless communication module, based on at least a parameter sent form said control unit.

10. A communication terminal apparatus according to claim 7, wherein the plurality of communication modes further include a non-periodic communication mode in which said first wireless communication module executes communication on a non-periodic basis, and wherein when the non-periodic communication mode is selected, said first wireless communication module executes communication on a non-periodic basis and, in a predetermined period including at least a period in which said first wireless communication module is executing communication, said first wireless communication module conveys to said second wireless communication module a signal by which to suppress an execution of communication.

11. A communication terminal apparatus according to claim 7, wherein the plurality of communication modes further includes a constant communication mode which always permits execution of communication by said second wireless communication module, and wherein when the constant communication mode is selected, said control unit has said second wireless communication module execute communication without negotiation in advance with said first wireless communication module.

12. A communication terminal apparatus according to claim 7, wherein the plurality of communication modes further includes a prohibited communication mode which always suppresses execution of communication with said second wireless communication module, and wherein when the prohibited communication mode is selected, said control unit has said second wireless communication module forcibly stop execution of communication.

13. A method for controlling communications of a first wireless communication module which executes communication in a predetermined frequency band, using a first communication scheme, and a second wireless communication module which executes communication in the predetermined band, using a second communication scheme differing from the first communication scheme, in accordance with a reference communication cycle common thereto, the method including:

determining a first prohibited communication period of the second wireless communication module in each communication cycle of the second wireless communication module, wherein the first communication prohibited period is determined based on a number of wireless terminals wirelessly connected to the first wireless communication module, determining a second prohibited communication period of the second wireless communication module every N communication cycles, where N is a natural number more than 1, so that a period for prohibiting the second wireless communication module from executing communication is extended when the second prohibited communication period is included in the communication cycle, and sending parameters associated with the first prohibited communication period and the second prohibited communication period to the second wireless communication module, wherein the second wireless communication module autonomously stops communication in the first and second prohibited communication periods.

14. A method for controlling communications according to claim 13, the method further including:

selecting a communication mode from among a plurality of communication modes including at least a periodic communication mode in which the first wireless communication module and the second wireless communication module execute communication in accordance with the reference communication cycle common thereto; and controlling the execution of respective communications of the first wireless communication module and the second wireless communication module according to the selected communication mode.

15. A non-transitory computer-readable medium having stored therein a program executable by a computer for controlling communications of a first wireless communication module which executes communication in a predetermined frequency band, using a first communication scheme and a second wireless communication module which executes communication in the predetermined frequency band, using a second communication scheme differing from the first communication scheme, causing the computer to perform:

controlling communications of the first wireless communication module and the second wireless communication module in accordance with a reference communication cycle common thereto;

determining a first prohibited communication period of the second wireless communication module in each communication cycle of the second wireless communication module, wherein the first communication prohibited period is determined based on a number of wireless terminals wirelessly connected to the first wireless communication module;

determining a second prohibited communication period of the second wireless communication module every N communication cycles, where N is a natural number more than 1, so that a period for prohibiting the second wireless communication module from executing communication is extended when the second prohibited communication period is included in the communication cycle; and sending parameters associated with the first prohibited communication period and the second prohibited communication period to the second wireless communication module, wherein the second wireless communication module autonomously stops communication in the first and second prohibited communication periods.

16. A computer-readable medium having stored therein a program executable by a computer for controlling communications according to claim 15, the program further including the functions of:

selecting a communication mode from among a plurality of communication modes including at least a periodic communication mode in which the first wireless communication module and the second wireless communication module each execute communication in accordance with the reference communication cycle common thereto; and controlling the execution of respective communications of the first wireless communication module and the second wireless communication module according to the selected communication mode.

17. The method of controlling communications of claim 13, further comprising the steps of:

setting the communication cycle of said first wireless communication module equal to that of said second wireless communication module, and setting the first prohibited communication period to a period from a start timing to a first timing in the communication cycle of the first wireless communication module by the control unit, and setting the second prohibited communication period to a period from a second timing after the first timing to the end timing in the communication cycle of the first wireless communication module.

18. The computer-readable medium of claim 15, wherein the computer performs the steps of:

setting the communication cycle of said first wireless communication module equal to that of said second wireless communication module, and setting the first prohibited communication period to a period from a start timing to a first timing in the communication cycle of the first wireless communication module by the control unit, and setting the second prohibited communication period to a period from a second timing after the first timing to the end timing in the communication cycle of the first wireless communication module.

19. A communication terminal apparatus, comprising:

a first wireless communication module which executes communication in a predetermined frequency band, using a first communication scheme;

a second wireless communication module which executes communication in the predetermined band, using a second communication scheme that differs from the first communication scheme; and a control unit which has said first wireless communication module and said second wireless communication module execute communication in accordance with a reference communication cycle common thereto, wherein said control unit determines a first prohibited communication period of said second wireless communication module in each communication cycle of said second wireless communication module, wherein the first communication prohibited period is determined based on a communication load of the first wireless communication module, determines a second prohibited communication period of said second wireless communication module every N communication cycles, where N is a natural number more than 1, so that a period for prohibiting said second wireless communication module from executing communication is extended when the second prohibited communication period is included in the communication cycle, and sends parameters associated with the first prohibited communication period and the second prohibited communication period to the second wireless communication module, wherein the second wireless communication module autonomously stops communication in the first and second prohibited communication periods.

20. A communication terminal apparatus according to claim 19, wherein the control unit monitors the communication load of the first wireless communication module by monitoring the number of wireless terminal wirelessly connected to the first wireless communication module.

21. A communication system, comprising a communication terminal apparatus, at least one first wireless terminal which is wirelessly connected to the communication terminal apparatus, and at least one second wireless terminal which is wirelessly connected to the communication terminal apparatus, wherein the communication terminal apparatus including:

a first wireless communication module which executes communication with the at least one first wireless terminal in a predetermined frequency band, using a first communication scheme;

a second wireless communication module which executes communication with the at least one second wireless terminal in the predetermined band, using a second communication scheme that differs from the first communication scheme; and a control unit which has said first wireless communication module and said second wireless communication module execute communication in accordance with a reference communication cycle common thereto, wherein said control unit determines a first prohibited communication period of said second wireless communication module in each communication cycle of said second wireless communication module, wherein the first communication prohibited period is determined based on a number of first wireless terminals connected to the communication terminal apparatus, and determines a second prohibited communication period of said second wireless communication module every N communication cycles, where N is a natural number more than 1, so that a period for prohibiting said second wireless communication module from executing communication is extended when the second prohibited communication period is included in the communication cycle, and sends parameters associated with the first prohibited communication period and the second prohibited communication period to the second wireless communication module, wherein the second wireless communication module autonomously stops communication in the first and second prohibited communication periods.

* * * * *